United States Patent

Ogoshi et al.

[11] Patent Number: 6,028,698
[45] Date of Patent: Feb. 22, 2000

[54] HIGH-OUTPUT AND LOW-NOISE OPTICAL FIBER AMPLIFIER

[75] Inventors: Haruki Ogoshi; Hiroki Tachibana, both of Tokyo, Japan

[73] Assignee: The Furukawa Electric Co., Ltd., Tokyo, Japan

[21] Appl. No.: 08/970,540

[22] Filed: Nov. 14, 1997

[51] Int. Cl.[7] .............................. H04J 14/02; H01S 3/00
[52] U.S. Cl. .......................................... 359/341; 359/134
[58] Field of Search ................................... 359/341, 124, 359/134

[56] References Cited

U.S. PATENT DOCUMENTS

| | | | |
|---|---|---|---|
| 5,140,456 | 8/1992 | Huber | 359/341 |
| 5,218,608 | 6/1993 | Aoki | 372/6 |
| 5,406,411 | 4/1995 | Button et al. | 359/341 |
| 5,623,362 | 4/1997 | Mitsuda et al. | 359/341 |
| 5,706,124 | 1/1998 | Imoto et al. | 359/341 |
| 5,745,283 | 4/1998 | Inagaki et al. | 359/341 |
| 5,808,787 | 9/1998 | Meli et al. | 359/341 |

OTHER PUBLICATIONS

Auge, J. et al, "Repeaterless Transmission With 62.9 dB Power Budget Using A Highly Efficient Erbium–Doped Fiber Amplifier Module", Lecture No. TuC3 Bulletin, Topical Meeting on Optical Amplifiers, Optical Society of America, Aug. 1990, pp. 156–159.

Way, W.I. et al, "Noise Figure of a Gain–Saturated Erbium–Doped Fiber Amplifier Pumped at 980 nm", Lecture No. TuB3 Bulletin, Topical Meeting on Optical Amplifiers, Optical Society of America, Aug. 1990, pp. 134–137.

Laming, R.I. et al, "Saturated Erbium–Doped Fibre Amplifiers", Lecture No. MB3 Bulletin, Topical Meeting on Optical Amplifiers, Optical Society of America, Aug. 1990, pp. 16–19.

Marcerou, J.F. et al, "Erbium–Doped Fibers Improvement For Optical Amplifier Modules", Lecture No. MD7 Bulletin, Topical Aug. 1990, pp. 68–71.

*Primary Examiner*—Mark Hellner
*Attorney, Agent, or Firm*—Jacobson, Price, Holman & Stern PLLC

[57] ABSTRACT

An optical fiber amplifier can maintain its optical power output above a level exceeding +20 dBm and a low noise figure if the input optical signal shows a high power level. It comprises a front stage amplifying optical fiber 11 doped with a rare-earth element and arranged in a front stage 10A thereof and a back stage amplifying optical fiber 12 also doped with a rare-earth element and arranged in a back stage 10B thereof, wherein the front stage amplifying optical fiber 11 is provided at the signal light input terminal 13 thereof with a first optical coupler 14 for coupling signal light and excitation light in a same direction and at the signal light output terminal 15 thereof with a second optical coupler 16 for coupling signal light and excitation light in opposite directions and the back stage amplifying optical fiber 12 is provided at the signal light input terminal 19 thereof with a third optical coupler 21 for coupling signal light and excitation light in opposite directions, the first, second and third optical couplers 14, 16 and 21 being connected respectively to a first excitation light source 17 for generating excitation light with the 1,480 nm wavelength, a second excitation light source 18 for generating excitation light with the 980 nm wavelength and a third excitation light source 22 for generating excitation light with the 1,480 nm wavelength.

3 Claims, 8 Drawing Sheets

OPTICAL CHARACTERISTICS OF AN OPTICAL FIBER AMPLIFIER ACCORDING TO THE INVENTION

INPUT/OUTPUT CHARACTERISTIC

NOISE CHARACTERISTIC

HIGH-OUTPUT AND LOW-NOISE OPTICAL FIBER AMPLIFIER

BACKGROUND OF THE INVENTION

1. Field of the Invention

This invention relates to an optical fiber amplifier to be used for an optical video distribution system or a wavelength-multiplexing communication system and, more particularly, it relates to an optical fiber amplifier with a high output level and a low noise level.

2. Prior Art

A source of excitation light with a wavelength of 980 nm or 1,480 nm is popularly used for an Er-doped type optical fiber amplifier (hereinafter simply referred to as optical fiber amplifier).

When a source of excitation light with the 980 nm wavelength is used for an optical fiber amplifier, the noise figure (NF) of the optical fiber amplifier will be 3 dB, which is very advantageous for the use of such an amplifier. However, when excitation light having the 980 nm wavelength is used, the efficiency with which the energy of excitation light is converted into that of signal light is as low as about 50%.

The conversion efficiency is inherently specific to the wavelength or the frequency of excitation light and can be obtained by calculation using formula (1) below.

Conversion efficiency=(Plank's constant×signal light frequency/ Plank's constant×excitation light frequency)  (1)

The value obtained by this formula is a theoretical limit value. Thus, the actual conversion efficiency will be smaller than the theoretical limit value and vary depending on the configuration of the optical fiber amplifier in question.

The noise figure that arises with the use of excitation light having the 980 nm wavelength was discussed in the lecture with Lecture No. TuB3 (Bulletin; pp. 134–137) at the Topical Meeting on Optical Amplifiers (August, 1990) held under the auspices of the Optical Society of America.

Some characteristic aspects of the conversion efficiency of optical fiber amplifiers were discussed in the lecture with Lecture No. MB3 (Bulletin; pp. 16–19) at the above identified international conference.

When a source of excitation light having the 1,480 nm wavelength is used for an optical fiber amplifier, the noise figure (NF) of the optical fiber amplifier will be between 6 dB and 9 dB, which is less advantageous if compared with a source of excitation light having the 980 nm wavelength. However, as may be seen from the above formula, when signal light has a wavelength of 1,530 nm, the conversion efficiency is as high as between 70% and 85% because of the proximity of the wavelength of excitation light and that of signal light.

The noise figure that arises with the use of excitation light having the 1,480 nm wavelength was discussed in the lecture with Lecture No. MD7 (Bulletin; pp. 68–71) also at the above identified international meeting. Additionally, some characteristic aspects of the conversion efficiency of optical fiber amplifiers using excitation light with the 1,480 nm wavelength were discussed in the lecture with Lecture No. TuC3 (Bulletin; pp. 156–159) at the same international conference.

Meanwhile, in the course of technological development of optical telecommunications networks in recent years, there has been an increased demand for optical fiber amplifiers with a high-output level and a low-noise level that are adapted to multipoint connection and wavelength-multiplexing communication.

Optical fiber amplifiers that can meet the demand are required to show an optical output level of more than +20 dBm, while conventional optical fiber amplifiers commonly have an output level between +16 dBm and +19 dBm.

Japanese Patent Application Laid-Open No. 4-149525 discloses an optical fiber amplifier combining the low noise characteristic of excitation light with the 980 nm wavelength and the high-output characteristic of excitation light with 1,480 nm wavelength. FIG. 6 of the accompanying drawings schematically illustrates an optical fiber amplifier 60 disclosed in Japanese Patent Application Laid-Open No. 4-149525. A source of excitation light 62 with the 980 nm wavelength is arranged at the input side of the amplifying optical fiber 61 while another source of excitation light 63 with the 1,480 nm wavelength is arranged at the output side of the amplifying optical fiber 61. In FIG. 6, reference numeral 64 denotes an optical coupler.

A similar optical fiber amplifier is proposed in U.S. Pat. No. 5,140,456.

FIG. 7(*a*) is a graph showing the output characteristic of an optical fiber amplifier as shown in FIG. 6 and FIG. 7(*b*) is a graph showing the noise characteristic of the same optical fiber amplifier of FIG. 6. The excitation light source 62 with the 980 nm wavelength has an output level of 90 mW and the excitation light source 63 with the 1,480 nm wavelength has an output level of 140 mW both in terms the optical fiber pig tail of an excitation LD module, representing the currently available highest practical output level of a stand-alone excitation LD module. As seen from FIGS. 7(*a*) and 7(*b*), while the optical fiber amplifier shows a good noise characteristic, its output is +19 dBm to +20 dBm at most.

FIG. 8 shows a two-stage optical fiber amplifier 70 designed to raise the output level, keeping a low noise performance.

Referring to FIG. 8, there are provided a front stage excitation light source 71, back stage excitation light sources 72 and 73, a front stage amplifying optical fiber 74 and a back stage amplifying optical fiber 75.

The front stage optical fiber amplifier 70A has the wavelength of 980 nm and operates for excitation, maintaining its low-noise characteristic, whereas the back stage optical fiber amplifier 70B has the wavelength of 1,480 nm and is adapted to bidirectional excitation by the excitation light sources 72 and 73 in order to realize a high output level.

With such bidirectional excitation using the wavelength of 1,480 nm, the amplifying optical fiber 75 has to have a large length in order to provide a high output level by absorbing excitation light and maintaining a sufficiently high conversion efficiency. On the other hand, when the back stage excitation light amplifier 70B has a long amplifying optical fiber 75 in the two-stage optical fiber amplifier 70, the backwardly advancing spontaneously emitted light (hereinafter referred to as backward amplified spontaneous emission or backward ASE) coming from the back stage amplifier operates to saturate the gain of the front stage amplifying optical fiber 74 and consequently reduce that of the front stage optical fiber amplifier 70A. The overall noise figure (NF) of a two-stage optical fiber amplifier is expressed by formula (2) below.

overall NF=front stage NF+{(back stage NF-1/front stage gain} (2)

It will be seen that the NF of the back stage becomes unnegligible to degrade the overall NF if the front stage has a small gain so that some means has to be provided to remove or reduce the adverse effect of the backward ASE. Techniques proposed for this purpose include the following.

(1) Insertion of an optical isolator between the front stage and the back stage; e.g., a method disclosed in U.S. Pat. No. 5,233,463.

(2) Insertion of an optical filter between the front stage and the back stage to remove ASE of the 1,530 nm band; e.g., a method disclosed in U.S. Pat. No. 5,406,411.

(3) The use of a relatively short amplifying optical fiber in the back stage to minimize the ASE of the back stage.

However, with any or all of the above three methods, the gain of the front stage is apt to be saturated and reduced to consequently degrade the overall NF in an optical fiber amplifier adapted to an optical video distribution system or a wavelength multiplexing communication system because of the high input level of signal light.

Additionally, if the ASE minimization technique of (3) above is used in a two-stage optical fiber amplifier having a configuration as shown in FIG. 8, there arises a problem that the energy of excitation light with the 1,480 nm wavelength is not satisfactorily absorbed by the amplifying optical fiber 75 and any residual excitation energy will be simply wasted to result in a poor output performance as illustrated in FIG. 7(*b*).

Still additionally, an excitation light source is required to continously oscillate with an energy output level of 100 mW or more on a highly reliable basis. However, it is known that excitation light sources with the 980 nm wavelength can abruptly suspend the optical operation.

Thus, in order for an optical system comprising an optical fiber amplifier to improve its reliability, the optical fiber amplifier is required to maintain its optical output characteristic above a predetermined level if its excitation light source with the 980 nm wavelength abruptly suspends its optical operation possibly by means of an additional excitation light source it comprises.

Referring to the optical fiber amplifier of FIG. 8, if the excitation light source with the 980 nm wavelength suspends its optical operation, the front stage amplifying optical fiber 74 operates as a light absorbing medium for any signal light to consequently degrade the noise figure and reduce the optical power output level of the optical fiber amplifier.

In view of the above described circumstances, it is therefore the object of the present invention to provide an optical fiber amplifier that can maintain its optical power output above a level exceeding +20 dBm and a low noise figure if its excitation light source with the 980 nm wavelength abruptly suspends its operation.

SUMMARY OF THE INVENTION

According to the invention, the above object is achieved by providing an optical fiber amplifier comprising a front stage amplifying optical fiber doped with a rare-earth element and arranged in a front stage thereof and a back stage amplifying optical fiber also doped with a rare-earth element and arranged in a back stage thereof, characterized in that said front stage amplifying optical fiber is provided at the signal light input terminal thereof with a first optical coupler for coupling signal light and excitation light in a same direction and at the signal light output terminal thereof with a second optical coupler for coupling signal light and excitation light in opposite directions and said back stage amplifying optical fiber is provided at the signal light input terminal thereof with a third optical coupler for coupling signal light and excitation light in opposite directions, said first, second and third optical couplers being connected respectively to a first excitation light source for generating excitation light with the 1,480 nm wavelength, a second excitation light source for generating excitation light with the 980 nm wavelength and a third excitation light source for generating excitation light with the 1,480 nm wavelength.

Preferably, an optical fiber amplifier according to the invention further comprises an optical isolator arranged between the output terminal of said second optical coupler and the input terminal of said back stage amplifying optical fiber.

Alternatively and preferably, an optical fiber amplifier according to the invention further comprises a notch filter for cutting off the 1,530 nm wavelength arranged between the output terminal of said second optical coupler and the input terminal of said back stage amplifying optical fiber.

Since an excitation light source with the 1,480 nm wavelength and an excitation light source with the 980 nm wavelength are respectively connected to the input terminal and the output terminal of an optical fiber amplifier according to the invention, the front stage amplifying optical fiber can eliminate or minimize the saturation of the gain and secure a sufficiently large gain because the front stage amplifying optical fiber can generously receive the output of the excitation light source with the 1,480 nm wavelength due to the excitation light source with the 1,480 nm wavelength and the excitation light source with the 980 nm wavelength connected respectively to the input terminal and the output terminal of the front stage amplifying optical fiber if the input signal light has a large power level.

For example, while the excitation light power level practically available from an excitation light source with the 980 nm wavelength is about 90 mW, an excitation light power level of about 140 mW is available from an excitation light source with the 1,480 nm wavelength.

Meanwhile, the overall noise figure of the optical fiber amplifier is dominated by the noise figure of the front stage and the noise figure of the amplifying optical fiber of the front stage is advantageously very close to the theoretical noise figure value of 3 dB of that optical fiber because it operates for excitation at the 980 nm wavelength. Thus, the overall noise figure of the optical fiber amplifier will be very advantageous.

Additionally, since an excitation light source with the 1,480 nm wavelength is connected to the input terminal of the front stage amplifying optical fiber, any residual excitation energy that is not absorbed by the front stage amplifying optical fiber will pass through the optical coupler connecting the front stage and the back stage to aid the optical excitation of the back stage amplifying optical fiber so that practically no excitation energy will be wasted.

Still additionally, if no non-reciprocal device such as an optical isolator is connected between the front stage and the back stage and excitation light from the excitation light source with the 1,480 nm wavelength connected to the output terminal of the back stage amplifying optical fiber is not absorbed by said back stage amplifying optical fiber to remain as residual excitation light, the residual excitation energy passes through the optical coupler connecting the front stage and the back stage and gets to the amplifying optical fiber of the front stage to participate in energizing the amplifying optical fiber of the front stage so that the excitation energy is not wasted.

Thus, an optical fiber amplifier according to the invention can provide a high output level exceeding +20 dBm.

If the excitation light source with the 980 nm wavelength abruptly suspends its operation, excitation light with the 1,480 nm wavelength keeps on entering the amplifying optical fiber of the front stage and that of the back stage to maintain the supply of excitation light above a predetermined level, if the noise figure and the power output of the optical fiber amplifier may be degraded to a small extent.

If an optical fiber amplifier according to the invention further comprises an optical isolator arranged between the output terminal of the second optical coupler and the input terminal of the back stage amplifying optical fiber, any backward ASE from the back stage is prevented from getting to the front stage so that the gain saturation of the front stage can be maintained to a minimal level.

The optical isolator arranged between the output terminal of the second optical coupler and the input terminal of the back stage amplifying optical fiber shows only a small insertion loss of about 0.6 dB relative to the 1,480 nm wavelength so that the residual excitation light with the 1,480 nm wavelength in the front stage can get to the back stage and hence can be effectively utilized as excitation energy.

If, alternatively, an optical fiber amplifier according to the invention further comprises a notch filter for cutting off the 1,530 nm wavelength arranged between the output terminal of said second optical coupler and the input terminal of said back stage amplifying optical fiber, any backward ASE from the back stage is also prevented from getting to the front stage so that the gain saturation of the front stage can be maintained to a minimal level.

The notch filter arranged between the output terminal of said second optical coupler and the input terminal of said back stage amplifying optical fiber for cutting off the 1,530 nm wavelength shows only a small insertion loss of about 0.5 dB relative to the 1,480 nm wavelength so that the residual excitation light with the 1,480 nm wavelength in the front stage can get to the back stage and hence can be effectively utilized as excitation energy.

DETAILED DESCRIPTION OF THE PREFERRED EMBODIMENTS

Now, the present invention will be described in greater detail by referring to FIGS. 1 through 5 illustrating preferred embodiments of the invention.

(1st Embodiment)

Figure 1:
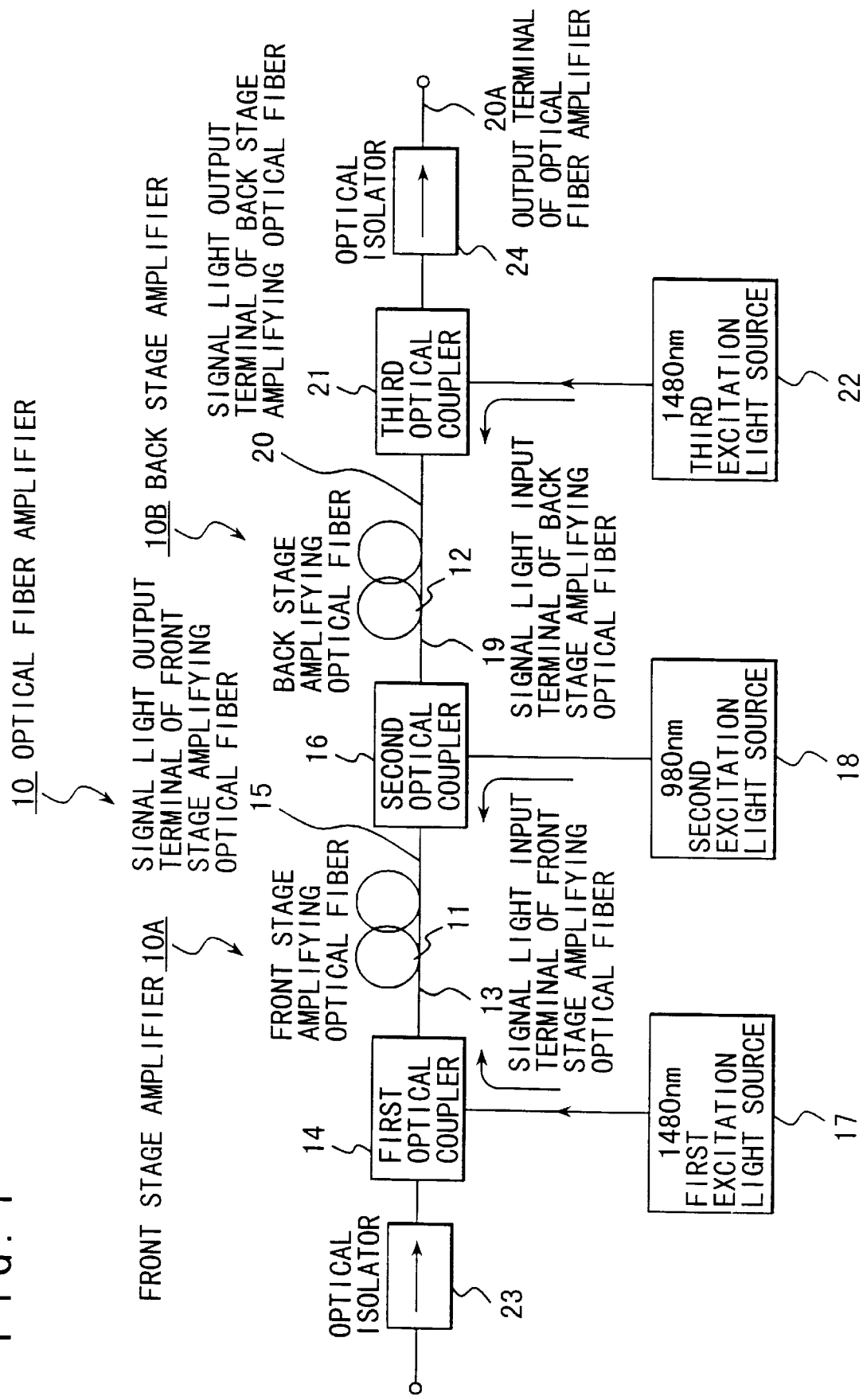
FIG. 1 is a schematic circuit diagram of an embodiment of optical fiber amplifier according to the invention.

FIG. 1 is a schematic circuit diagram of a first embodiment of optical fiber amplifier according to the invention. Referring to FIG. 1, the optical fiber amplifier 10 is a two-stage amplifier comprising a front stage amplifier 10A and a back stage amplifier 10B, which are respectively provided with a front stage amplifying optical fiber 11 and a back stage amplifying optical fiber 12. The front stage amplifying optical fiber 11 is connected to a first optical coupler for coupling signal light and excitation light in a same direction at the signal light input terminal 13 of the amplifying optical fiber 11, while a second optical coupler 16 is connected to the signal light output terminal 15 of the amplifying optical fiber 11 for coupling signal light and excitation light in opposite directions.

A first excitation light source 17 for generating excitation light with the 1,480 nm wavelength is connected to the first optical coupler 14 and a second excitation light source 18 for generating excitation light with the 980 nm wavelength is connected to the second optical coupler 15.

The signal light input terminal 19 of the back stage front stage 12 is connected to the output terminal of the second optical coupler 16 and a third optical coupler 21 is connected to the signal light output terminal 20 of the back stage amplifying optical fiber 12 for coupling signal light and excitation light in opposite directions.

A third excitation light source 22 for generating excitation light with the 1,480 nm wavelength is connected to the third optical coupler 21.

In FIG. 1, reference numerals 23 and 24 respectively denote an input side optical isolator and an output side optical isolator.

(Specification Example)

Figure 2:
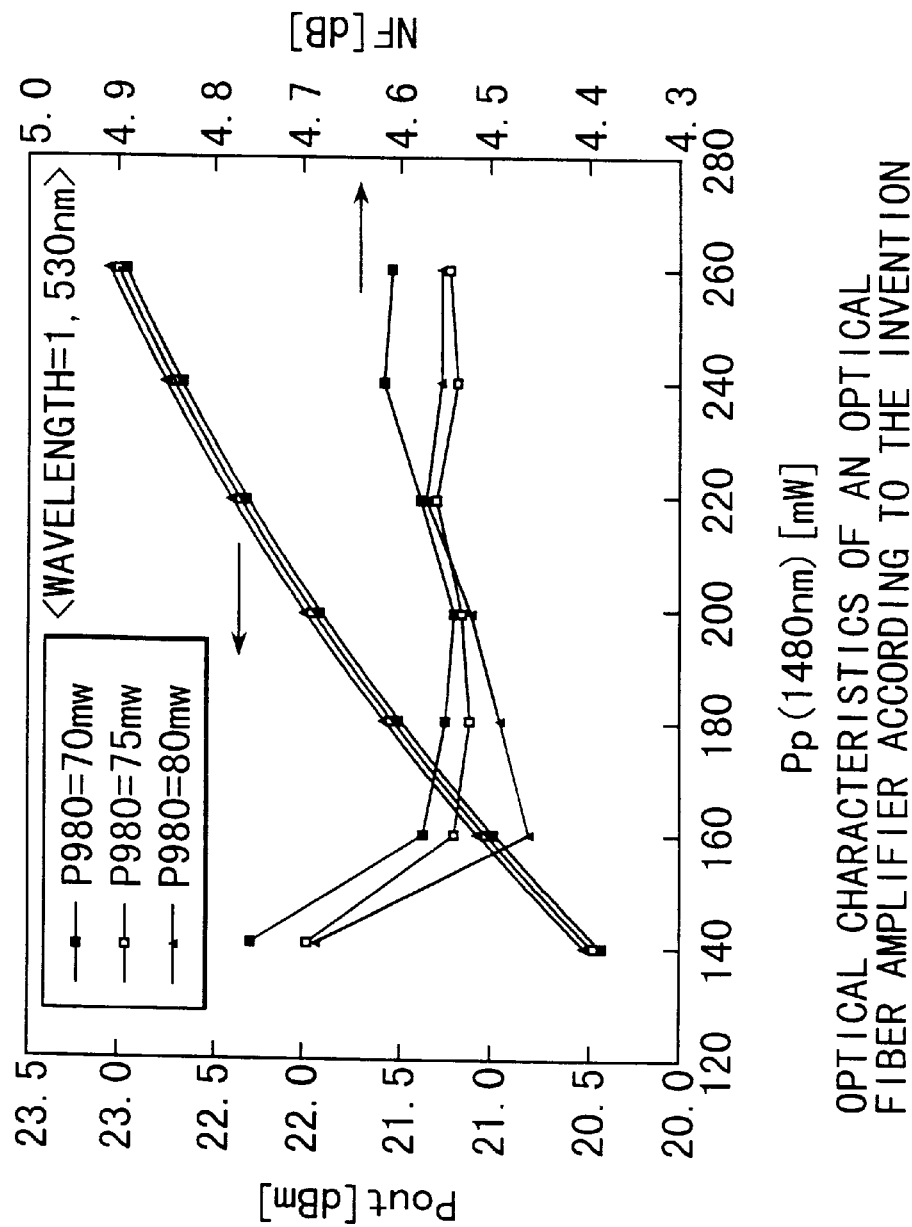
FIG. 2 is a graph illustrating some of the optical characteristics of the embodiment of optical fiber amplifier of FIG. 1.

For example, the above described optical fiber amplifier 10 may be specifically defined in the following terms.

length of front stage amplifying optical fiber 11: 6 m
  length of back stage amplifying optical fiber 12: 20 m
  total insertion loss of input side optical components of front stage amplifier 10A: 0.9 dB
  total insertion loss of output side optical components of front stage amplifier 10A: 0.8 dB
  insertion loss of excitation light with the 1,480 nm wavelength relating to optical coupler 14 of front stage amplifier 10A: 0.4 dB
  insertion loss of excitation light with the 980 nm wavelength relating to second optical coupler 16 between front stage amplifier 10A and back stage amplifier 10B: 0.4 dB
  insertion loss of signal light relating to second optical coupler 16 between front stage amplifier 10A and back stage amplifier 10B: 0.5 dB
  insertion loss of excitation light with the 1,480 nm wavelength relating to third optical coupler 21 of back stage amplifier 10B: 0.4 dB
  parameters of amplifying optical fibers 11 and 12: mode field diameter: 7.0 um
  Er ion concentration: 1,000 ppm
  Al ion concentration: 30,000 ppmw FIG. 2 is a graph illustrating some of the optical characteristics of the optical fiber amplifier of 10. In the graph of FIG. 2, the horizontal axis represents the power of excitation light, whereas the left and right vertical axes respectively represent the power of output light and the noise figure.

The power of output light is determined at the signal light output terminal 20 of the amplifying optical fiber 12 of the back stage amplifier 10B and the noise figure does not contain the insertion loss of the optical components of the optical coupler 14 and other devices of the input side.

The power of excitation light refers to the power of light directly striking the amplifying optical fibers 11 and 12. The power of excitation light with the 1,480 nm wavelength is equal to the sum of the power of excitation light with the 1,480 nm wavelength of the first excitation light source 17 of the front stage amplifier 10A and that of the third excitation light source 22 of the back stage amplifier 10B.

In this embodiment, the power of excitation light of the excitation light source 17 and that of the excitation light source 22 are made equal to each other. If a commercially available excitation laser module with the 1,480 nm wavelength having an output power level of 140 mW is used in this embodiment, the insertion loss of the optical couplers 14 and 21 is equal to 0.4 dB and hence the power of excitation light with the 1,480 nm wavelength striking the amplifying optical fibers 11 and 12 is equal to about 128 mW each, or about 255 mW in total.

With the above arrangement, an output power of 22.8 dBm is obtained at the output terminal 20A of the back stage amplifier 10B of FIG. 2. Since the total insertion loss of the optical components of the back stage amplifier 10B is equal to 0.8 dB, the resultant output power of the optical fiber amplifier 10 is as high as 22.0 dBm.

It should also be noted that the noise figure of the optical fiber amplifier 10 is about 4.5 dB, which is close to the theoretical limit value of 3 dB in spite of the high power level of input signal light that is equal to 0. dBm.

(2nd Embodiment)

Figure 3:
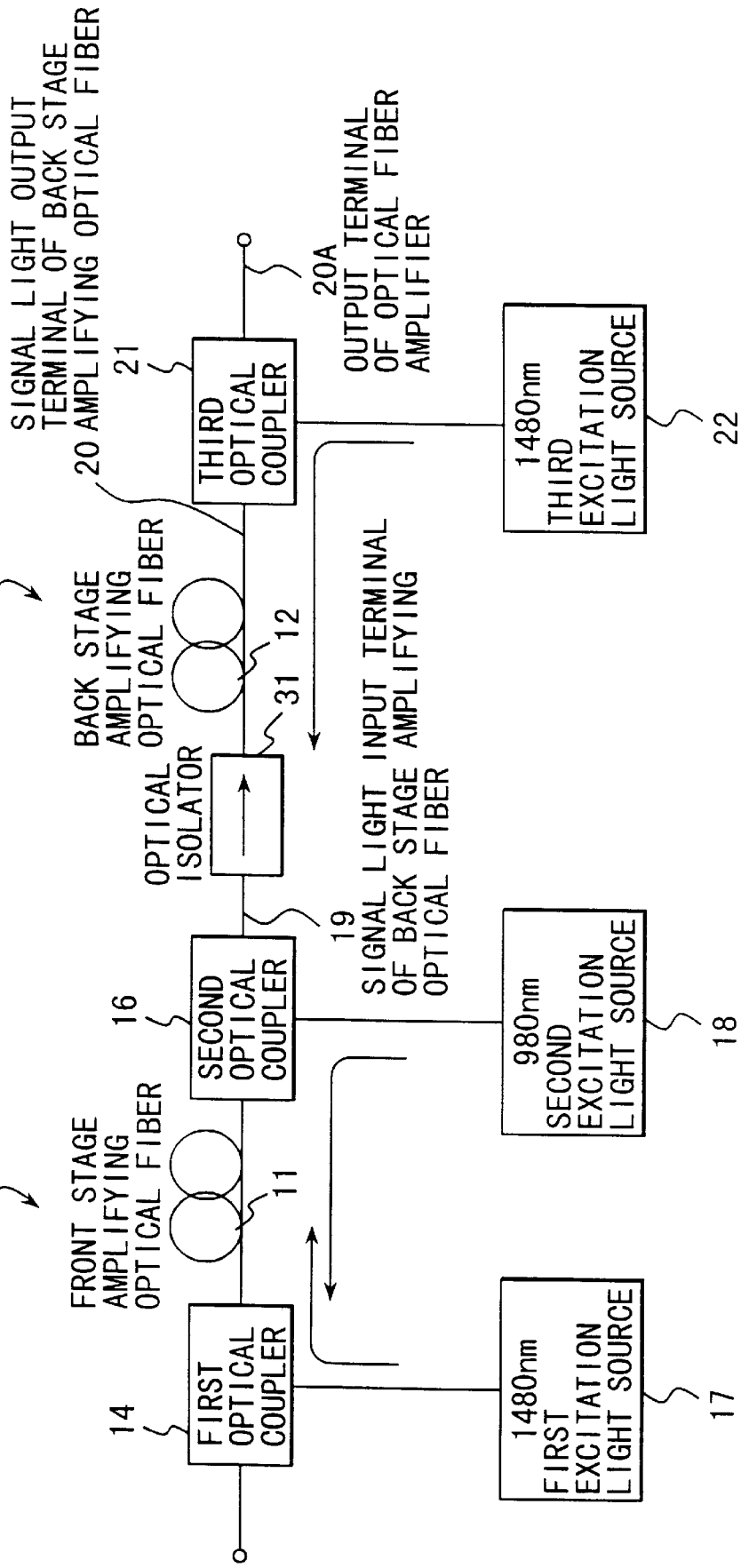
FIG. 3 is a schematic circuit diagram of another embodiment of optical fiber amplifier according to the invention.

FIG. 3 is a schematic circuit diagram of a second embodiment of optical fiber amplifier according to the invention, which is indicated by reference numeral 30.

The optical fiber amplifier 30 is characterized by additionally comprising an optical isolator arranged between the second optical coupler 16 of the front stage amplifier 10A and the back stage amplifier 10B. Since this embodiment is otherwise same as the first embodiment, its components are denoted respectively by the reference symbols same as those of the first embodiment and will not be described any further.

Any backward ASE from the back stage amplifier 10B is prevented from getting to the front stage amplifier 10A by the optical isolator 31 arranged between the second optical coupler 16 and the back stage amplifier 10B to further reduce the gain saturation of the front stage amplifier 10A.

Additionally since an optical isolator 31 shows an insertion loss that is as small as about 0.6 dB relative to the wavelength of 1,480 nm, the energy of residual excitation light with the 1,480 nm wavelength of the first excitation light source 17 of the front stage amplifier 10A can safely get to the back stage amplifier 10B and hence can be effectively exploited.

(3rd Embodiment)

Figure 4:
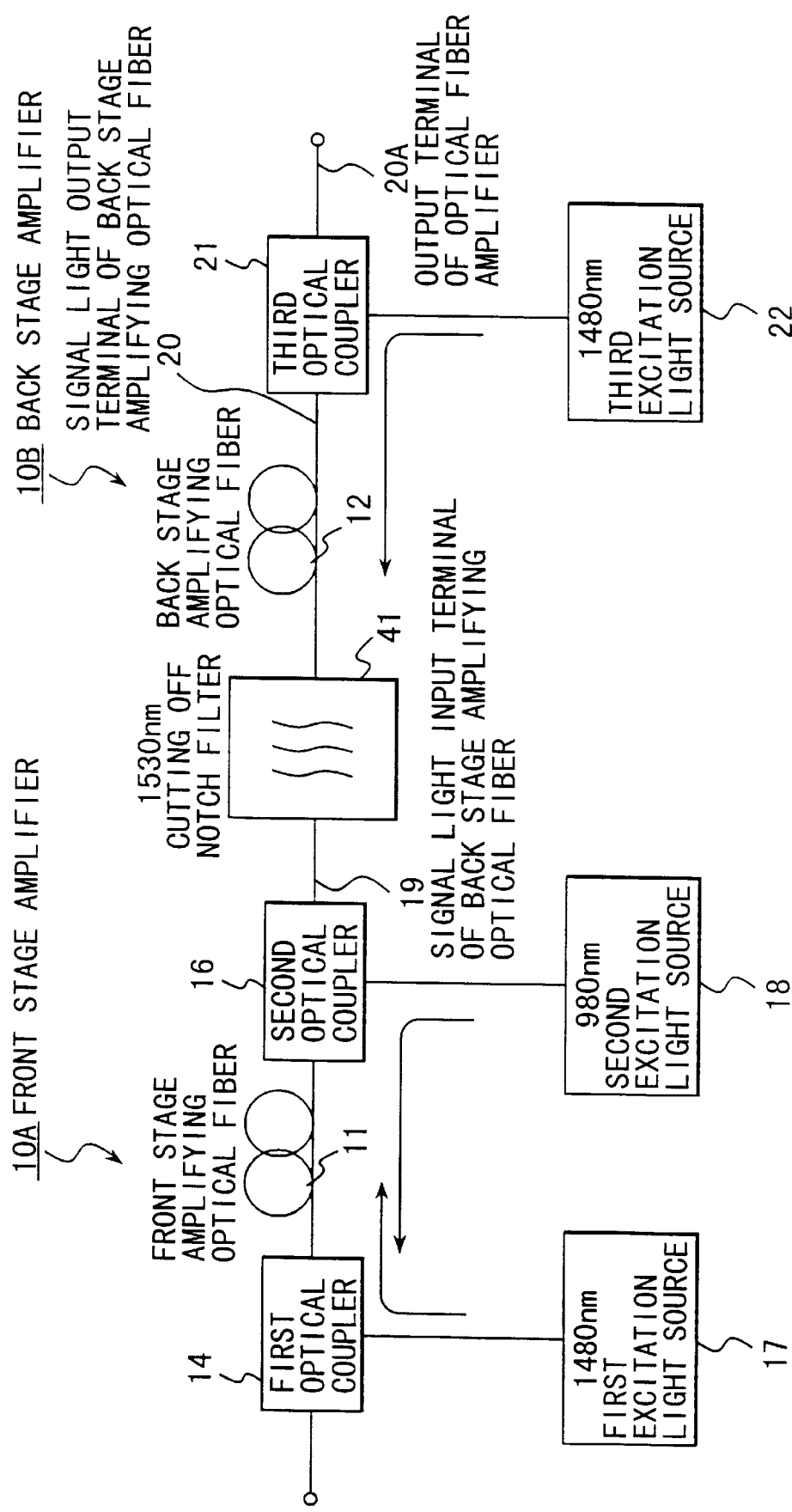
FIG. 4 is a schematic circuit diagram of still another embodiment of optical fiber amplifier according to the invention.

FIG. 4 is a schematic circuit diagram of a third embodiment of optical fiber amplifier according to the invention, which is indicated by reference numeral 40.

The optical fiber amplifier 40 is characterized by additionally comprising a notch filter 41 arranged between the second optical coupler 16 of the front stage amplifier 10A and the back stage amplifier 10B for cutting off the 1,530 nm wavelength band having an ASE level greater than that of any other wavelength. Since this embodiment is otherwise same as the first embodiment, its components are denoted respectively by the reference symbols same as those of the first embodiment and will not be described any further.

Any backward ASE from the back stage amplifier 10B is prevented from getting to the front stage amplifier 10A by the notch filter 41 arranged between the second optical coupler 16 and the back stage amplifier 10B to further reduce the gain saturation of the front stage amplifier 10A.

Additionally since a notch filter 41 for cutting off the 1,530 nm wavelength band shows an insertion loss that is as small as about 0.5 dB relative to the wavelength of 1,480 nm, the energy of residual excitation light with the 1,480 nm wavelength of the first excitation light source 17 of the front stage amplifier 10A can safely get to the back stage amplifier 10B and hence can be effectively exploited.

(4th Embodiment)

Figure 5:
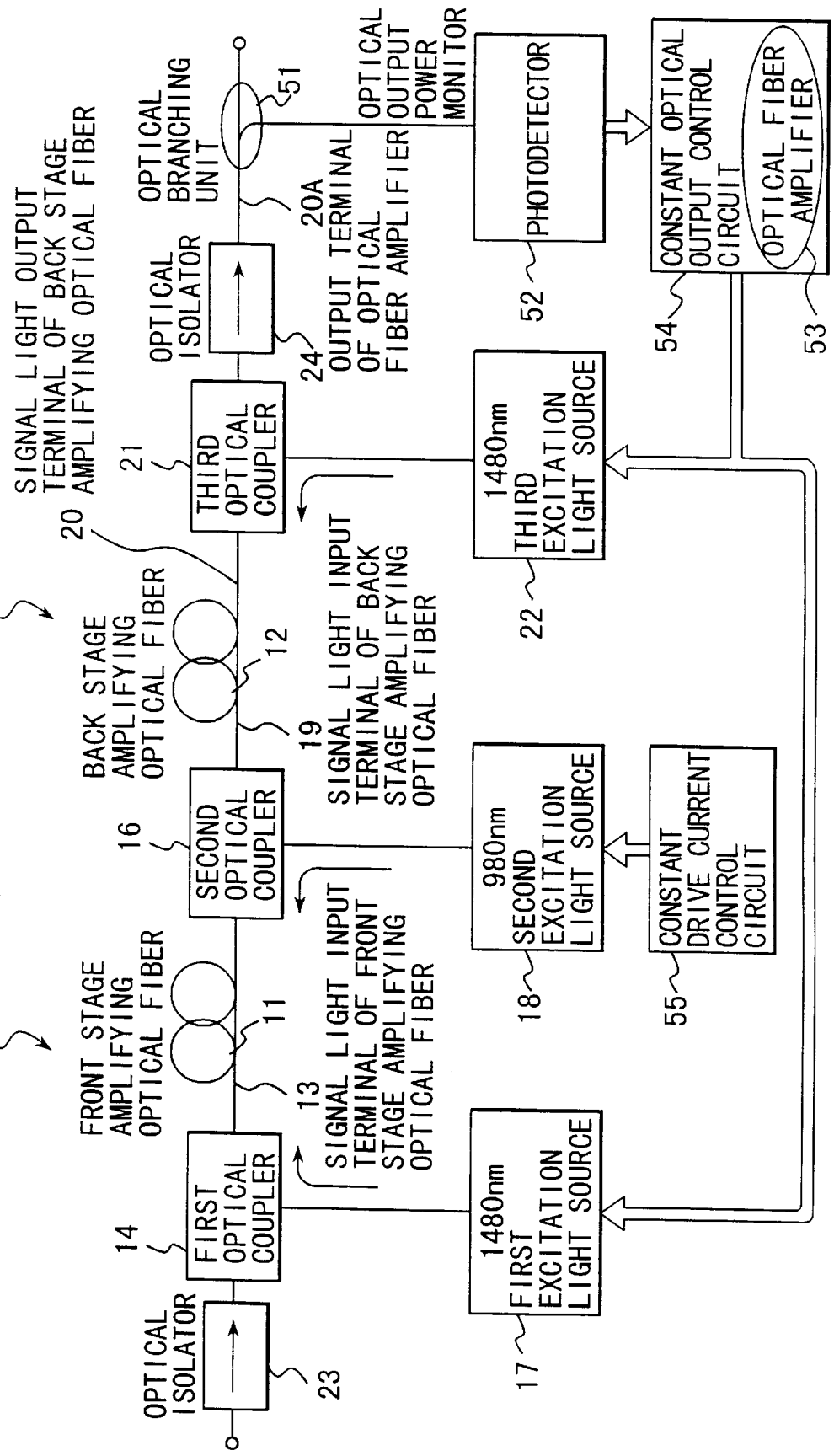
FIG. 5 is a schematic circuit diagram of a further embodiment of optical fiber amplifier according to the invention.
Figure 6:
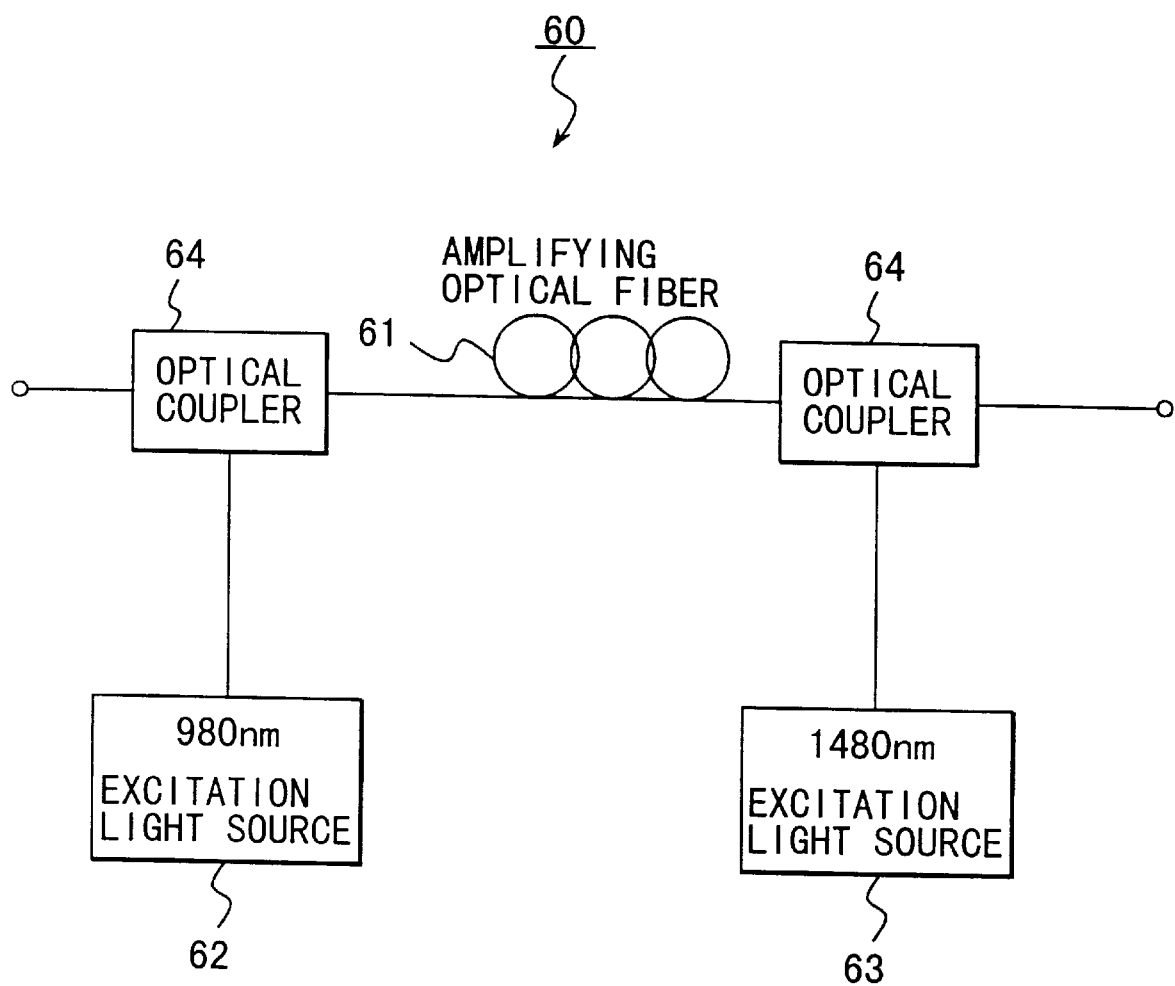
FIG. 6 is schematic circuit diagram of a known optical fiber amplifier according to the invention.
Figure 7A:
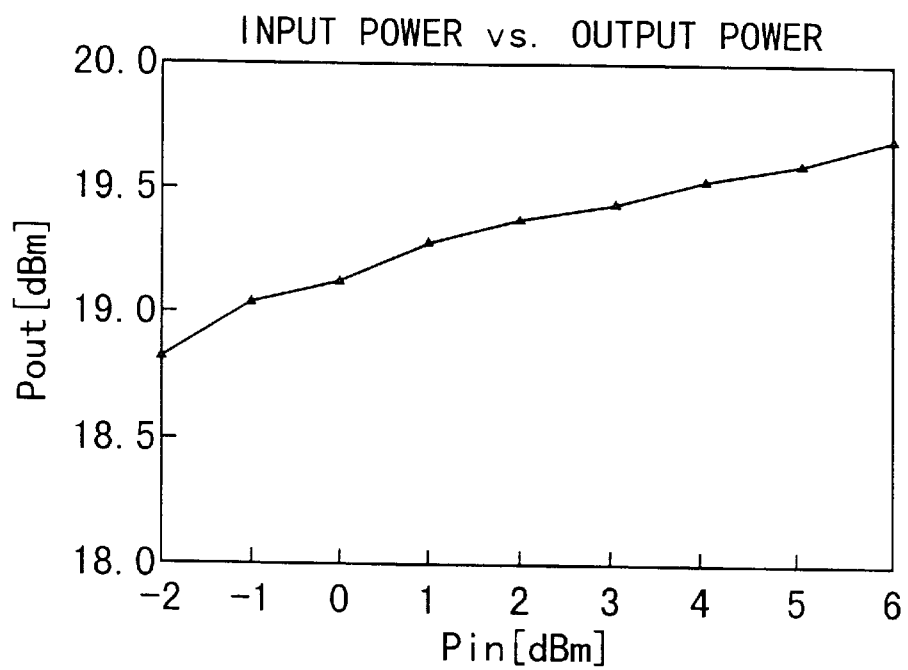
FIGS. 7(a) and 7(b) are graphs showing some of the optical characteristics of the known optical fiber amplifier of FIG. 6.
Figure 7B:
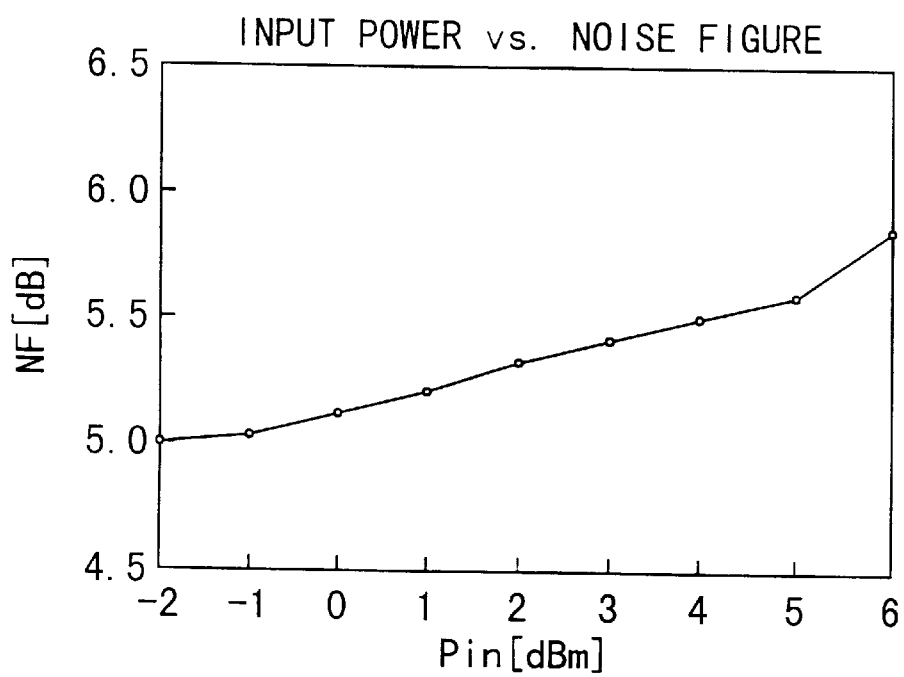

FIG. 5 is a schematic circuit diagram of a fourth embodiment of optical fiber amplifier according to the invention, which is indicated by reference numeral 50.

The optical fiber amplifier 50 is characterized by additionally comprising an optical branching unit 51 arranged at the output terminal 20A of the back stage amplifier 10B to monitor the optical power output of the optical fiber amplifier 50 by means of a photodetector 52 arranged downstream relative to the branching unit 51.

The optical power output of the optical fiber amplifier 50 detected by the photodetector 52 is fed back to a constant optical output control circuit 54 having a built-in optical fiber amplifier 53, which control circuit 54 controls the output power of excitation light with the 1,480 nm wavelength from the first excitation light source of the front stage amplifier 10A and the third excitation light source 22 of the back stage amplifier 10B to a predetermined constant level.

In FIG. 5, reference numeral 55 denotes a control circuit for controlling the drive current of the second excitation light source 18 of the front stage amplifier 10A to a constant level.

Since this embodiment is otherwise same as the first embodiment, its components are denoted respectively by the reference symbols same as those of the first embodiment and will not be described any further.

When the operation of the second excitation light source 18 for excitation light with the 980 nm wavelength is suspended in this optical fiber amplifier 50, the power output of excitation light of the first excitation light source 17 and that of the third excitation light source 22 for excitation light with the 1,480 nm wavelength are raised to consequently maintain the optical output level of the optical fiber amplifier 50.

Additionally, when the operation second excitation light source 18 for excitation light with the 980 nm wavelength is suspended, the first excitation light source 17 for excitation light with the 1,480 nm wavelength continues to energize the amplifying optical fiber 11 so that the rise, if any, in the noise figure of the optical fiber amplifier 50 can be minimized.

Table 1 below shows changes in some of the optical characteristics of the above described optical fiber amplifier 50 and those of the known optical fiber amplifier 70 of FIG. 8 for comparison when the operation of the light source for excitation light with the 980 nm wavelength is suspended in each of the amplifiers.

When the excitation light source for excitation light with the 980 nm wavelength of the known optical fiber amplifier 70 stops its optical operation, the front stage amplifying optical fiber of the front stage amplifier becomes to operate as a light absorbing medium for any input signal light to remarkably degrade the noise figure.

To the contrary, the optical fiber amplifier 50 according to the invention shows such degradation only slightly.

TABLE 1

Changes observed in some of the optical characteristics when the excitation light source for excitation light with the 980nm wavelength stops its optical operation
wavelength of signal light: 1,530 nm

Figure 8:
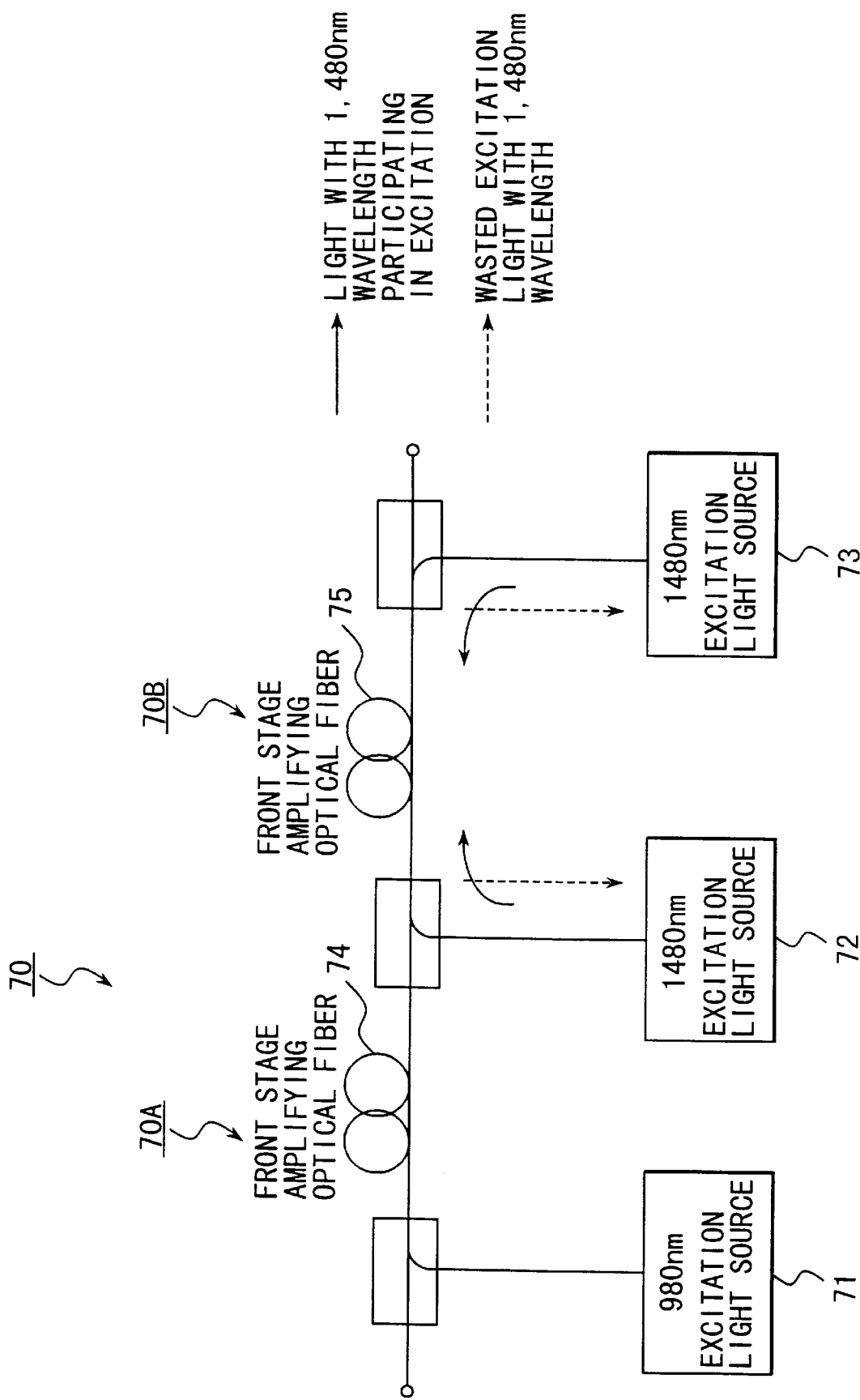
FIG. 8 shows a two stage fiber optic amplifier.

| amplifier | fall in optical power output | rise in noise figure |
| --- | --- | --- |
| amplifier of FIG. 8 | 5.5dB | 12dB |
| amplifier of FIG. 5 | 0dB | 0.5dB |

[Advantages of the Invention]

As described above in detail, since an excitation light source with the 1,480 nm wavelength and an excitation light source with the 980 nm wavelength are respectively connected to the input terminal and the output terminal of an optical fiber amplifier according to the invention, the front stage amplifying optical fiber can eliminate or minimize the saturation of the gain and secure a sufficiently large gain because the front stage amplifying optical fiber can generously receive the output of the excitation light source with the 1,480 nm wavelength due to the excitation light source with the 1,480 nm wavelength and the excitation light source with the 980 nm wavelength connected respectively to the input terminal and the output terminal of the front stage amplifying optical fiber if the input signal light has a large power level.

Meanwhile, the overall noise figure of the optical fiber amplifier is dominated by the noise figure of the front stage and the noise figure of the amplifying optical fiber of the front stage is advantageously very close to the theoretical noise figure value of 3 dB of that optical fiber because it operates for excitation at the 980 nm wavelength. Thus, the overall noise figure of the optical fiber amplifier will be very advantageous.

Additionally, since an excitation light source with the 1,480 nm wavelength is connected to the input terminal of the front stage amplifying optical fiber, any residual excitation energy that is not absorbed by the front stage amplifying optical fiber will pass through the optical coupler connecting the front stage and the back stage to aid the optical excitation of the back stage amplifying optical fiber so that practically no excitation energy will be wasted.

Still additionally, if no nonreciprocal device such as an optical isolator is connected between the front stage and the back stage and excitation light from the excitation light source with the 1,480 nm wavelength connected to the output terminal of the back stage amplifying optical fiber is not absorbed by said back stage amplifying optical fiber to remain as residual excitation light, the residual excitation energy passes through the optical coupler connecting the front stage and the back stage and gets to the amplifying optical fiber of the front stage to participate in energizing the amplifying optical fiber of the front stage so that the excitation energy is not wasted.

Thus, an optical fiber amplifier according to the invention can provide a high output level exceeding +20 dBm.

If the excitation light source with the 980 nm wavelength abruptly suspends its operation, excitation light with the 1,480 nm wavelength keeps on entering the amplifying optical fiber of the front stage and that of the back stage to maintain the supply of excitation light above a predetermined level, if the noise figure and the power output of the optical fiber amplifier may be degraded to a small extent.

If an optical fiber amplifier according to the invention further comprises an optical isolator arranged between the output terminal of the second optical coupler and the input terminal of the back stage amplifying optical fiber, any backward ASE from the back stage is prevented from getting to the front stage so that the gain saturation of the front stage can be maintained to a minimal level.

The optical isolator arranged between the output terminal of the second optical coupler and the input terminal of the back stage amplifying optical fiber shows only a small insertion loss of about 0.6 dB relative to the 1,480 nm wavelength so that the residual excitation light with the 1,480 nm wavelength in the front stage can get to the back stage and hence can be effectively utilized as excitation energy.

If, alternatively, an optical fiber amplifier according to the invention further comprises a notch filter for cutting off the 1,530 nm wavelength arranged between the output terminal of said second optical coupler and the input terminal of said back stage amplifying optical fiber, any backward ASE from the back stage is also prevented from getting to the front stage so that the gain saturation of the front stage can be maintained to a minimal level.

The notch filter arranged between the output terminal of said second optical coupler and the input terminal of said back stage amplifying optical fiber for cutting off the 1,530 nm wavelength shows only a small insertion loss of about 0.5 dB relative to the 1,480 nm wavelength so that the residual excitation light with the 1,480 nm wavelength in the front stage can get to the back stage and hence can be effectively utilized as excitation energy.

What is claimed is:

1. An optical fiber amplifier comprising a front stage amplifying optical fiber doped with a rare-earth element and arranged in a front stage thereof and a back stage amplifying optical fiber also doped with a rare-earth element and arranged in a back stage thereof, characterized in that said front stage amplifying optical fiber is provided at the signal light input terminal thereof with a first optical coupler for coupling signal light and excitation light in a same direction and at the signal light output terminal thereof with a second optical coupler for coupling signal light and excitation light in opposite directions and said back stage amplifying optical fiber is provided at the signal light input terminal thereof with a third optical coupler for coupling signal light and excitation light in opposite directions, said first, second and third optical couplers being connected respectively to a first excitation light source for generating excitation light with the 1,480 nm wavelength, a second excitation light source for generating excitation light with the 980 nm wavelength and a third excitation light source for generating excitation light with the 1,480 nm wavelength.

2. An optical fiber amplifier according to claim 1, characterized by further comprising an optical isolator arranged between the output terminal of said second optical coupler and the input terminal of said back stage amplifying optical fiber.

3. An optical fiber amplifier according to claim 1, characterized by further comprising a notch filter for cutting off the 1,530 nm wavelength arranged between the output terminal of said second optical coupler and the input terminal of said back stage amplifying optical fiber.

* * * * *